United States Patent [19]

Nishioka et al.

[11] Patent Number: 4,676,592
[45] Date of Patent: Jun. 30, 1987

[54] IMAGE TRANSMITTING OPTICAL SYSTEM USING OPTICAL FIBER BUNDLE

[75] Inventors: Kimihiko Nishioka; Susumu Takahashi, both of Hachiouji, Japan

[73] Assignee: Olympus Optical Co., Ltd., Tokyo, Japan

[21] Appl. No.: 582,735

[22] Filed: Feb. 23, 1984

[30] Foreign Application Priority Data

Feb. 24, 1983 [JP] Japan .................. 58-28596

[51] Int. Cl.$^4$ ............................ G02B 6/06; A61B 1/00
[52] U.S. Cl. ............................ 350/96.25; 350/96.24; 350/96.26; 350/96.28; 128/4; 128/6
[58] Field of Search ............. 350/96.1, 96.24, 96.25, 350/96.26, 96.27, 96.28; 362/32; 128/6, 7, 8, 9, 4, 362, 395, 396, 397

[56] References Cited

U.S. PATENT DOCUMENTS

| | | | |
|---|---|---|---|
| 3,637,282 | 1/1972 | Hayamizu et al. | 350/96.25 |
| 3,669,524 | 6/1972 | Shio | 350/96.25 |
| 4,157,216 | 6/1979 | Plummer | 128/6 X |
| 4,196,990 | 4/1980 | Forsyth | 128/6 X |

FOREIGN PATENT DOCUMENTS 47-23224  6/1972  Japan .................. 350/96.25

OTHER PUBLICATIONS

Greasley, "Film Viewing Device" IBM Tech. Disc. Bull. vol. 15, No. 8, 1/73, p. 2606.

Primary Examiner—William L. Sikes
Assistant Examiner—Brian M. Healy
Attorney, Agent, or Firm—Cushman, Darby & Cushman

[57] ABSTRACT

An image transmitting optical system comprising an objective, an image guide formed of an optical fiber bundle, an eyepiece, a relay-lens system, and a stop capable of changing an aperture provided adjacently to any of the position of an exit pupil of the eyepiece, the position conjugate with the exit pupil in respect of the relay-lens system or the position of an entrance pupil of the objective, in order to enable to photograph more clearly even in a short distance photographing.

4 Claims, 16 Drawing Figures

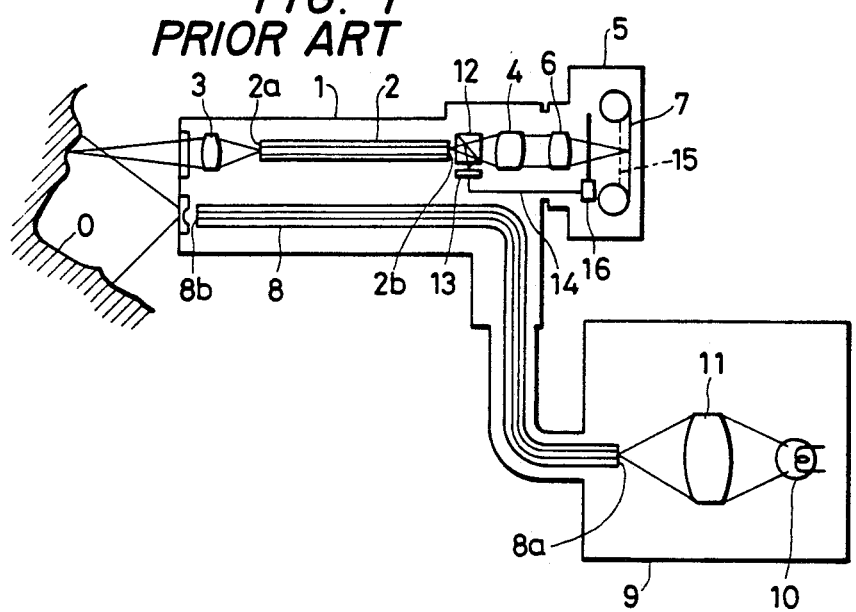
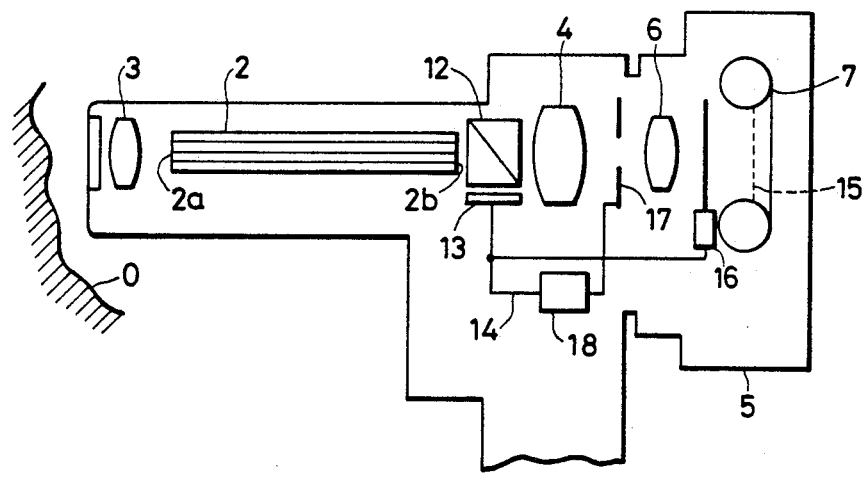
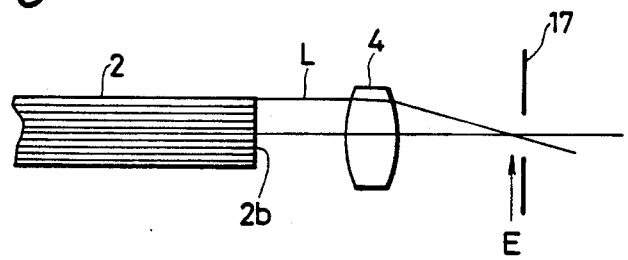

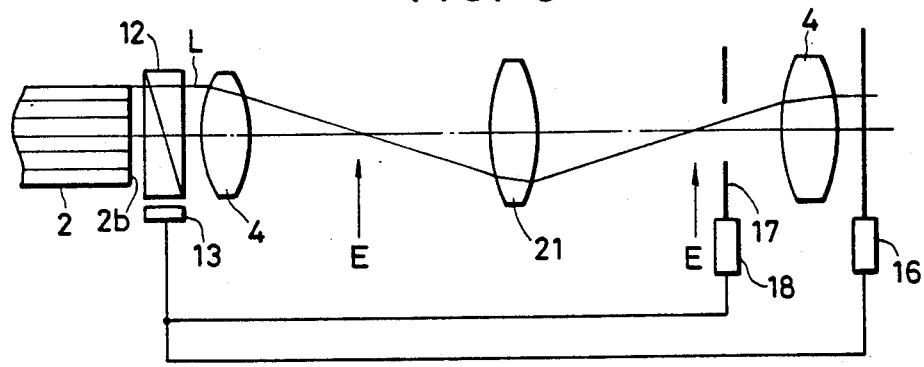
FIG. 9
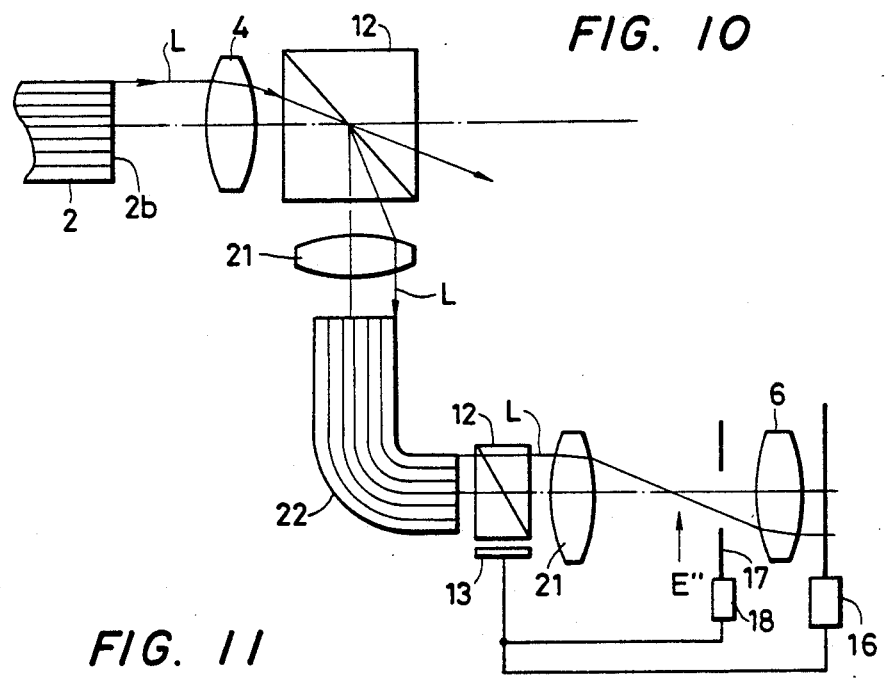
FIG. 10
FIG. 11
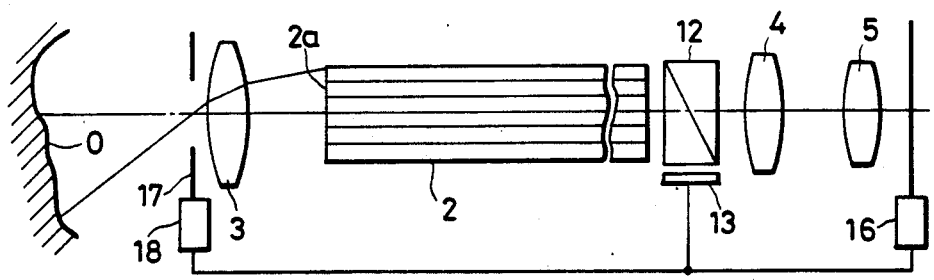

IMAGE TRANSMITTING OPTICAL SYSTEM USING OPTICAL FIBER BUNDLE

BACKGROUND OF THE INVENTION (a) Field of the Invention

The present invention relates to an image transmitting optical system used for an endoscope and the like, and more specifically, to an image transmitting optical system using an optical fiber bundle.

(b) Description of the Prior Art

A conventional endoscope, for example, as shown in FIG. 1 is formed so that an image guide 2 is provided within an elongate body 1, the image of an object 0 is formed onto an entrance end face 2a of the image guide 2 by an objective 3, the image is transmitted to an exit end face 2b through the image guide 2, and the image of the exit end face 2b is formed onto an film 7 through an eyepiece 4 and a camera lens 6 in a camera body 5. And it is formed so that a light guide 8 is provided within the body 1, the light of a lamp 10 in a light source box 9 is entered an entrance end face 8a of the light guide 8 by a condenser lens 11, and the light is transmitted to an exit end face 8b through the light guide 8 to illuminate the surface of the object 0. Arranged between the exit end face 2b of the image guide 2 and the eyepiece 4 is a half prism 12 by which a part of light rays issued from the image guide 2 is transmitted onto a light receiving element 13 and the signal generated at the element 13 is led through a lead wire 14 to be transmitted to a shutter control circuit 16 for controlling the opening and closing of a shutter 15. If the distance from the objective 3 to the object 0 is long, the input signal to the shutter control circuit 16 becomes small as the surface of the object 0 is dark and consequently the speed of the shutter 15 is decreased. If the distance from the objective 3 to the object 0 is short, the input signal to the shutter control circuit 16 becomes large as the surface of the object 0 is bright and consequently the speed of the shutter 15 is increased. Therefore, the endoscope is formed so that a proper exposure may be automatically performed by the above formation. However, as this optical system performs the exposure control by changing the shutter speed, a stop aperture is always constant and the shutter speed is considerably increased in the case of the short distance photographing and consequently, as a focal depth becomes small substantially, there is a problem that the photograph is easy to be unclear.

SUMMARY OF THE INVENTION

A primary object of the present invention is to provide an image transmitting optical system using an optical fiber bundle formed so that a focal depth may be changed together with the shutter speed in accordance with the distance between an objective and an object.

According to the present invention, the object is accomplished by arranging a stop capable of changing an aperture in the position of an exit pupil provided behind the exit end of an optical fiber bundle, in the position conjugate with the exit pupil, in the position of an entrance pupil of an objective, or adjacently to it.

According to a preferred formation of the present invention, assuming that a principal ray is emitted from the position of a half of a radius of the exit end face of an optical fiber bundle, when the height of the principal ray is hc and the height of a marginal ray is ha in a stop position in case the stop is fully opened, the condition $|hc| \leq |ha|$ is satisfied.

According to another preferred formation of the present invention, assuming that an exit angle $\beta$ of the ray emitted from one optical fiber is changed in the range of $\beta_{min} < \beta < \beta_{max}$ through the stop, when the average of an entrance angle of the ray to be included in the range is $\overline{\theta_{eff}}$, the condition $\overline{\theta_{eff}} < 5 \times (\beta_{max} + \beta_{min})/2$ is satisfied.

According to still another preferred formation of the present invention, the aperture of the stop is changed in accordance with a light receiving amount with a light receiving element so that a proper exposure or light adjustment may be performed automatically.

This and other objects of the present invention will become more apparent during the course of the following detailed description and appended claims.

BRIEF DESCRIPTION OF THE DRAWINGS

FIG. 1 is a view showing an optical system using a conventional optical fiber bundle;

FIG. 2 is a view showing an embodiment of an optical system using an optical fiber bundle according to the present invention;

FIG. 3 is an explanatory view of a principal ray;

FIGS. 9 through 11 are views showing each principal part of the second through the fourth embodiments according to the present invention;

DESCRIPTION OF THE PREFERRED EMBODIMENTS

Figure 4:
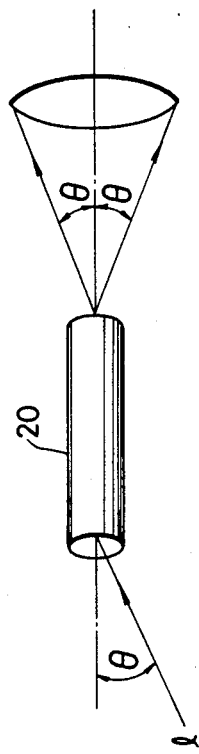
FIG. 4 is an explanatory view of one ideal optical fiber.

First, referring to FIGS. 2 through 8, the first embodiment according to the present invention shall be described. In these drawings, the same numeral reference is used to the same member and part as those shown in FIG. 1. The numeral reference 17 indicates an aperture stop arranged adjacently to the exit pupil of an eyepiece 4 by which the aperture is variable and the numeral reference 18 is a stop control circuit capable of controlling the size of the aperture of the aperture stop 17 by receiving the signal from the light receiving element 13. By the way, it is considered that the principal ray in this case is a ray L parallel to a lateral direction of one optical fiber of the image guide 2 formed of the optical fiber bundle, as shown in FIG. 3. In FIG. 3, E indicates the exit pupil.

The optical system according to the present invention is formed as above mentioned. Therefore, if the distance from the objective 3 to the object 0 is long, the exposure is performed in a state of the aperture stop 17 opened more largely by the operation of the stop control circuit 18 as the surface of the object 0 is dark and the output from the light receiving element 13 is small. If the distance from the objective 3 to the object 0 is short, the exposure is performed in a state of the light stop 17 stopped down smaller as the surface of the object 0 is bright and the output from the light receiving element 13 is large. Thus, the exposure is performed automatically by changing the aperture of the stop 17 in accordance with the distance from the objective 3 to the object 0. Especially, when the distance from the objective 3 to the object 0 is short, the focal depth of the image to be formed by the objective 3 results in increase.

Figure 5:
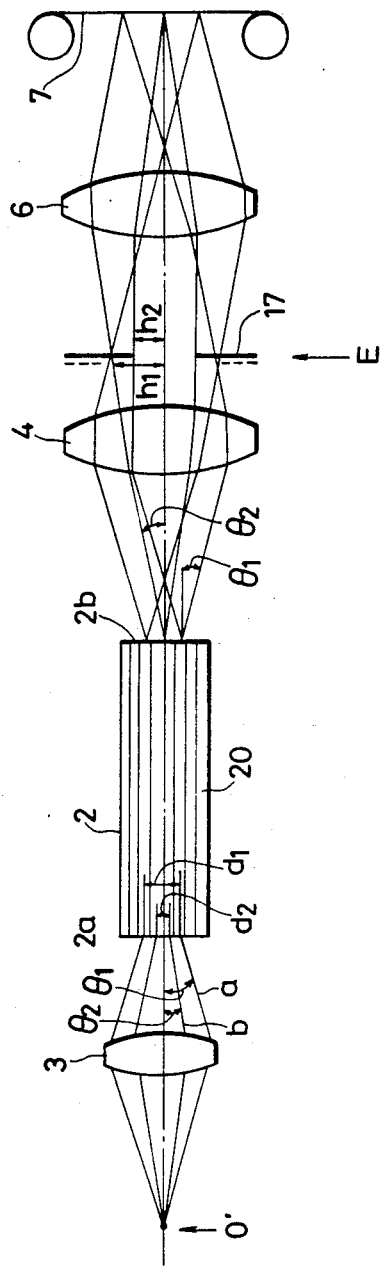
FIG. 5 is a view showing a basic principle of the present invention.
Figure 6:
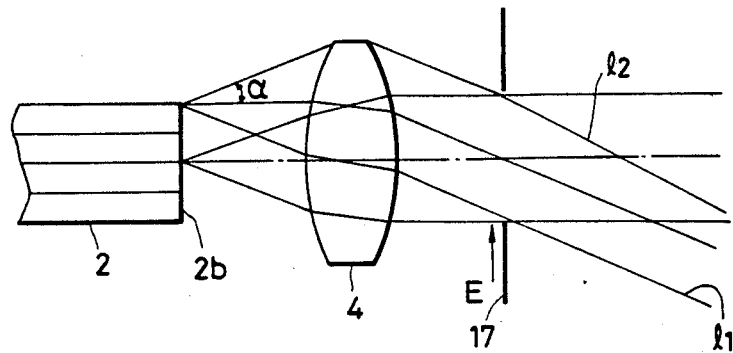
FIGS. 6 through 8 are explanatory views relating to each stop position.

This respect will be described in detail hereinafter. It is assumed that the image guide 2 comprises such an optical fiber 20 that an ideal optical fiber, that is, as shown in FIG. 4, a ray l projected at a angle $\theta$ to the axis of the optical fiber 20 emerges by forming a conical face having a tip angle $2\theta$ symmetric to the axis. Also, as shown in FIG. 5, there is a point shaped object 0' in front of the objective 3 and it is assumed that the objective 3 is in focus at a further distance than the point shaped object 0'. In this state, for example, on the entrance end face 2a of the image guide 2 is formed an unclear circle of light with a diameter $d_1$ which transmitted by the image guide 2 to appear as an unclear circle even on the exit end face 2b. Further, the unclear circle is formed onto the film 7 through the eyepiece 4 and camera lens 6 when the stop 17 is fully opened as illustrated with a dotted line. If the portion of the diameter $d_1$ of the unclear circle on the entrance end face 2b is made by a ray a projected at an entrance angle $\theta_1$ to the image guide 2 through the objective 3, the ray a emerges as a conical face with the angle $\theta_1$ in respect to an optical axis from the exit end face 2b by passing through the ideal optical fiber 20. If the portion of a diameter $d_2$ close to the center of the unclear circle on the entrance end face 2b is made by a ray b projected at an entrance angle $\theta_2$ to the image guide 2 through the objective 3, the ray b emerges as a conical face with the angle $\theta_2$ in respect to the optical axis from the exit end face 2b by passing through the ideal optical fiber 20. Here, assuming that ray heights at the exit pupil E of rays emerging at the angles $\theta_1$ and $\theta_2$ from the exit end face 2b of the image guide 2 are $h_1$ and $h_2$ respectively, if the radius of the stop 17 is $h_1$, the whole of an unclear circle with the diameter $d_1$ on the exit end face 2b will be taken on the film 7 as all exit rays emerging from the exit end face 2b pass through the stop 17. However, if the radius of the stop 17 is smaller $h_2$, the ray with the exit angle $\theta$ expressed below among the exit rays emerging from the exit end face 2b will not be able to pass through the stop 17:

$$\theta_2 \leq \theta \leq \theta_1 \tag{1}$$

In the unclear circle on the exit end face 2b, therefore, on the film 7 will not be taken the portion of the diameter d expressed by:

$$d_2 \leq d \leq d_1 \tag{2}$$

and on the film 7 will be taken only the portion of:

$$d \leq d_2 \tag{3}$$

This indicates that, when the stop 17 is stopped down, the size of the unclear circle to be taken on the film 7 becomes small. That is, the image of the point shaped object 0' on the film 7 approaches a point as the stop 17 is stopped down and this corresponds to the increase of the focal depth. Accordingly, since the embodiments are formed so that the aperture of the stop 17 may be small as the distance from the objective to the object is short, the focal depth of the objective 3 is increased as the objective 3 approaches the object 0 and consequently a clear photograph can be taken even in a short distance photographing.

Figure 7:
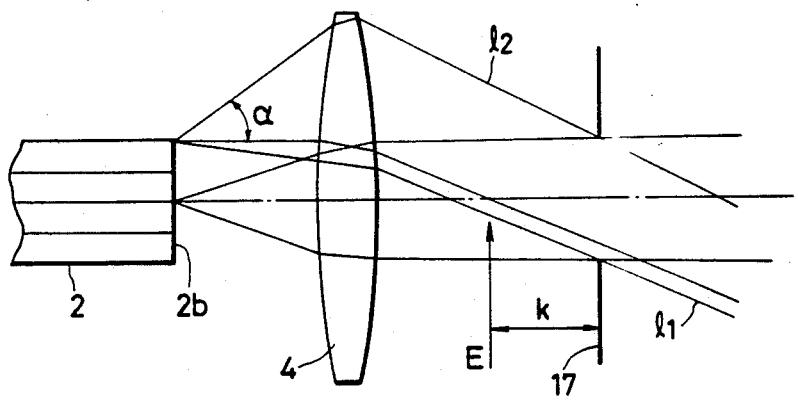

Next, the position of the stop 17 will be described. As shown FIG. 6, regarding the ray emerging from any portion of the exit end face 2b of the image guide 2 when the stop 17 is placed in the position of the exit pupil E of the eyepiece 4, a lower side ray $l_1$ and an upper side ray $l_2$ will be equally cut in order from the ray whose exit angle $\alpha$ is large as the aperture of the stop 17 is decreased. As shown in FIG. 7, however, when the stop 17 is placed in the position separated from the exit pupil E, the lower side ray $l_1$ will be more largely cut as the aperture of the stop 17 is decreased, whereas the upper side ray $l_2$ has a small amount to be cut. Accordingly, as the ray whose exit angle $\alpha$ is large among the exit rays emerging from the exit end face 2b also passes through the stop 17, the size of the unclear circle taken on the film 7 becomes large though the aperture of the stop 17 is the same as the case in FIG. 6. For this reason, as the focal depth becomes small as the image approaches a peripheral portion of the exit end face 2b, a constant limit must be added to a distance k from the exit pupil E to the stop 17. Practically, an effective stop position which the focal depth becomes large by stopping down the stop is determined by the following condition I.

(Condition I)

Figure 8:
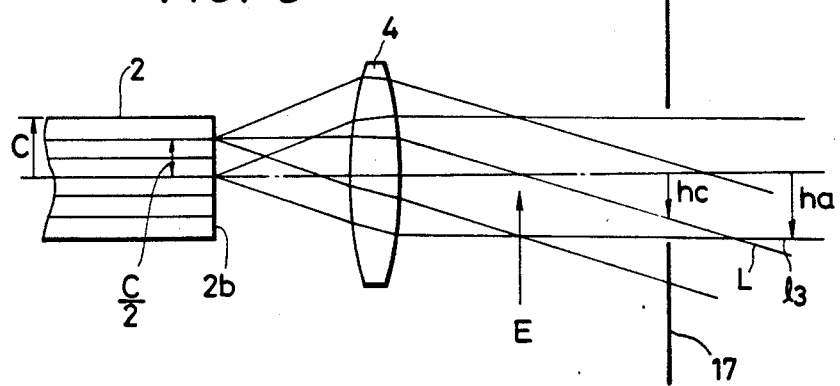

As shown in FIG. 8, when the height of a principal ray L is hc and the height of a marginal ray $l_3$ is ha in the position of the stop in case the stop 17 is fully opened, hc and ha must be as follows:

$$|hc| \leq |ha| \tag{4}$$

However, it is assumed that the principal ray is a principal ray emerging from the position of $\frac{1}{2}$ C when the radius of the exit end face 2b of the optical fiber bundle 2 is C and emerging from the position of $\frac{1}{2}$ of an approximate radius when the exit end face 2b of the optical fiber bundle 2 is not formed with a circle.

By the way, as in the second embodiment shown in FIG. 9 differently from the above embodiment, it is also desirable that stop 17 is placed in a position E' conjugate with the exit pupil E in respect of a relay lens 21 and, even in this case, the condition I will applied.

As in the third embodiment shown in FIG. 10, even when the transmission of the image is performed through a second image guide 22, the same effect is obtained by placing the stop 17 close to an exit pupil E'' of a relay optical system in rear of the exit end. Even in this case, the condition I will be applied.

As in the fourth embodiment shown in FIG. 11, even when the light stop 17 whose aperture is variable is placed in the position of the entrance pupil of the objective 3 in front of the image guide 2, the focal depth may be changed by making the aperture of the stop 17 change in accordance with the distance between the objective 3 and object 0. In this case, however, the optical fiber to form the image guide 2 will not have a need for a fiber similar to the ideal optical fiber.

As above mentioned, any embodiment provides advantages that the focal depth becomes large in the short distance photographing and the advantages are immense when the objective 3 is fixed. By the way, it is assumed that the principal ray of the objective 3 is almost parallel to the axis of the image guide 2 in any case except the embodiment shown in FIG. 11.

In respective embodiments mentioned above, an automatic exposure may be performed by providing both the shutter speed and the aperture of the aperture stop to be variable. Also, the present invention is able to be applied not only to photographing but to an automatic light adjusting device for observation by eye, a TV camera and the like.

In the above description, it is explained that the image guide 2 is formed of the ideal optical fiber. In an actual image guide, however, the ray projected at the entrance angle $\theta_1$ does not emerge at the exit angle $\theta_1$, but it generally emerges at a larger angle to some extent than the exit angle $\theta_1$. Accordingly, the focal depth in case the stop 17 is stopped down will not be so increased as the case it is assumed that the image guide 2 is formed of the ideal optical fiber.

Figure 12:
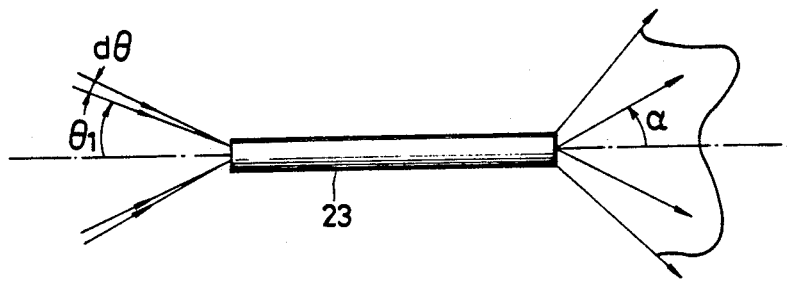
FIG. 12 is an explanatory view of one general optical fiber.
Figure 13:
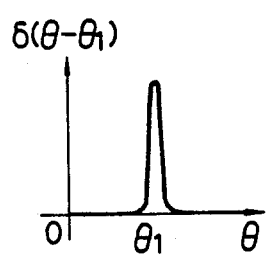
FIGS. 13 and 14 are views showing the intensity distribution of an entrance ray and an exit ray in each one general optical fiber.
Figure 14:
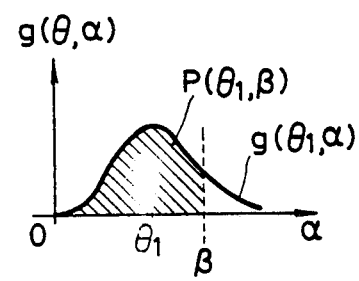

This respect will be explained in detail hereinafter. As shown in FIG. 12, when a conical face shaped ray bundle of an entrance angle $\theta_1 \sim \theta_1 + d\theta$ is projected to one optical fiber 23, the exit ray is assumed to be spread at angle $\alpha$. To express this with an equation, when the intensity distribution of the entrance ray is such a delta function as shown in FIG. 13, the intensity distribution of the portion of an exit ray $\alpha \sim \alpha + d\alpha$ is assumed to be such a function $g(\theta_1, \alpha)$ as shown in FIG. 14. Generally, $g(\theta_1, \alpha)$ is a mountain shaped function having a peak near $\theta_1$ and is expressed by:

$$\int_0^{\frac{\pi}{2}} g(\theta_1, \alpha) d\alpha = 1 \quad (5)$$

Figure 15:
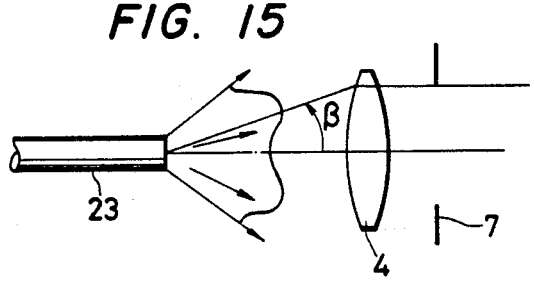
FIG. 15 is a view showing an optical system adjacent to the exit end of a general optical fiber.

Also, as shown in FIG. 15, assuming that a part of the exit ray emerging from one optical fiber 23 is intercepted by the stop 17 and a ray capable of passing through the stop 17 is one having an exit angle $\alpha$ or lower, a ratio $P(\theta_1, \beta)$ of its light amount to the whole light amount is as follows: (Refer to FIG. 14.)

$$P(\theta_1, \beta) = \int_0^{\beta} g(\theta_1, \alpha) d\alpha \quad (6)$$

By the way, the function $g(\theta_1, \alpha)$ includes a weight of a solid angle around the axis of the optical fiber 23.

Figure 16:
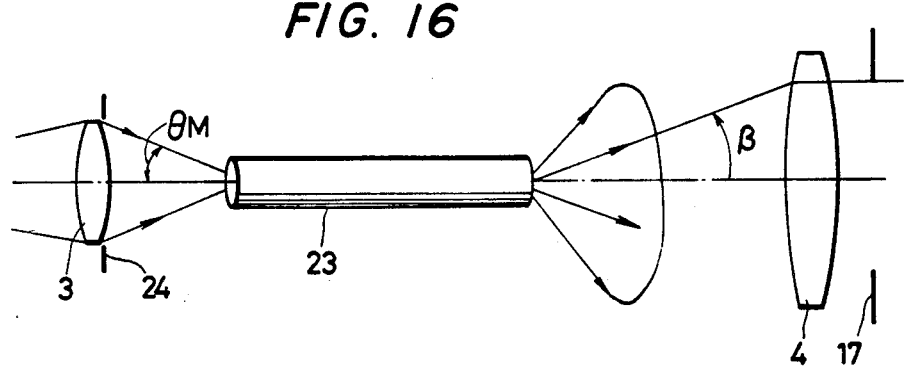
FIG. 16 is a view showing an optical system in front and rear of a general optical fiber.

Now, as shown in FIG. 16, consideration will be taken in case the ray bundle with a conical shape of a tip angle $2\theta_M$ is projected to one optical fiber 23. Practically, the angle $\theta_M$ is determined by a stop 24 of the objective 3. In the state shown in FIG. 16, assuming that the average of the entrance angle of the ray included in the ray bundle of the exit angle $\theta$ or lower is $\theta_{eff}$, the following equation is obtained:

$$\tfrac{1}{2}\sin^2\theta_{eff} = \int_0^{\theta} \max \frac{P(\theta_1, \beta)}{P(0, \beta)} \cdot \sin\theta_1\cos\theta_1 d\theta_1 \quad (7)$$

If the optical fiber 23 is the ideal optical fiber, $\theta_{eff}$ is as follows:

$\theta_{eff} = \theta_M$ (when $\beta \geq \theta_M$)

$\theta_{eff} = \beta$ (when $\beta < \theta_M$) $\quad (8)$

In this case, it may be supposed that the unclear circle formed by the ray bundle projected to the image guide 2 with the $\theta_{eff}$ is taken on the film 7. Accordingly, the degree with which the focal depth becomes large in case the stop is stopped down will be high as the value of $\theta_{eff}$ approaches the value in the case of the ideal optical fiber (Equation (8)).

Here, assuming that, in order to change the aperture of the stop 17, the value of $\beta$ changes in the range of $$\beta_{min} < \beta < \beta_{max} \quad (9)$$

and the average of $\theta_{eff}$ within the $\beta$ is $\overline{\theta_{eff}}$, the following equation is obained:

$$\overline{\theta_{eff}} = \frac{1}{\beta_{max} - \beta_{min}} \int_{\beta_{min}}^{\beta_{max}} \theta_{eff} d\beta \quad (10)$$

Therefore, if the value of $\theta_{eff}$ is $$\overline{\theta_{eff}} < 5 \frac{\beta_{max} + \beta_{min}}{2} \quad (11) \text{ (Condition II)}$$

an effect that the focal depth becomes large will be provided when the stop 17 is stopped down. Unless the $\overline{\theta_{eff}}$ satisfies the above condition II, the focal depth will hardly change as the brightness is changed only though the stop 17 is stopped down.

In the ideal optical fiber, if $\beta < \theta_M$, $\overline{\theta_{eff}}$ is obtained from $$\overline{\theta_{eff}} = \frac{\beta_{max} + \beta_{min}}{2} \quad (12)$$

and if $\beta \geq \theta_M$, it is expressed by:

$$\overline{\theta_{eff}} = \theta_M \leq \beta_{min} \quad (13)$$

In any case, therefore, the above condition II is certainly satisfied. The value of $\overline{\theta_{eff}}$ approaches the ideal optical fiber as it becomes small and the focal depth will become large by stopping down the stop 17.

In the optical system of the present invention, as mentioned above, since the focal depth becomes large by stopping down the stop, a clear photograph can be taken even in the case of a short distance photographing and particularly the invention is suitable for an optical system such as an endoscope and the like in which the objective is fixed.

We claim:

1. An image transmitting optical system comprising an objective, an image guide formed of an optical fiber bundle and having an entrance end face arranged on the image side of said objective, an eyepiece arranged in rear of an exit end of said image guide, and a stop arranged in the position or vicinity of an exit pupil of said eyepiece and capable of changing its aperture, and in which, when the height of a principal ray emitted from the position of a half of a radius of an exit end face of said image guide is hc and the height of a marginal ray is ha in the position of said stop in case said stop if fully opened, the condition $|hc| \leq |ha|$ is satisfied.

2. An image transmitting optical system according to claim 1, in which, when a maximum exit angle of a ray emitted from one optical fiber of said optical fiber bundle is $\beta_{max}$, a minimum exit angle is $\beta_{min}$, and the average of an entrance angle of an exit ray between said maximum exit angle $\beta_{max}$ and minimum exit angle $\beta_{min}$ is $\overline{\theta_{eff}}$ in case the exit angle is changed by said stop, the condition $\theta_{eff} < 5 \times (\beta_{max} + \beta_{min})/2$ is satisfied.

3. An image transmitting optical system according to claim 1, in which said image transmitting optical system further comprises a light receiving element arranged to receive a part of exit rays from said image guide and a stop control circuit connected to said light receiving element and capable of changing the aperture of said stop, and the aperture of said stop is changed in accordance with a light receiving amount of said light receiving element to perform an automatic proper exposure or an automatic light adjustment.

4. An image transmitting optical system according to claim 2, in which said image transmitting optical system further comprises a light receiving element arranged to receive a part of exit rays from said image guide and a stop control circuit connected to said light receiving element and capable of changing the aperture of said stop, and the aperture of said stop is changed in accordance with a light receiving amount of said light receiving element to perform an automatic proper exposure or an automatic light adjustment.

* * * * *